Patented May 12, 1925.

1,537,815

UNITED STATES PATENT OFFICE.

EDWARD VICTOR EVANS AND PERCY PARRISH, OF LONDON, AND ORLANDO WILLIAM WEIGHT, OF BROMLEY, ENGLAND.

PURIFICATION OF AMMONIUM SULPHATE.

No Drawing.  Application filed November 14, 1921. Serial No. 515,027.

*To all whom it may concern:*

Be it known that we, EDWARD VICTOR EVANS, PERCY PARRISH, and ORLANDO WILLIAM WEIGHT, all subjects of the King of Great Britain, residing, respectively, in London and Bromley, England, have jointly invented certain new and useful Improvements in the Purification of Ammonium Sulphate, of which the following is a specification.

The neutralization of the acid crystals from the ordinary ammonium sulphate saturator by means of a dilute solution of ammonia fed to the centrifugal machine in which the crystals have been drained, is a satisfactory operation. There are certain cases, however, particularly in the production of ammonium sulphate at coke ovens by the so-called direct or semi-direct process, where the crystals produced in the saturator are too fine to permit of satisfactory treatment in a centrifugal machine.

In these circumstances recourse must be had to stirring the crystals with the ammonia solution. Since efficient stirring and subsequent settling require a considerable proportion of liquid to solid, a simple ammonia solution would dissolve too much of the sulphate for profitable application. A known method consists in using neutralized mother liquor, that is to say, a saturated neutral solution of ammonium sulphate, and in continuing the washing until the solution leaving the crystals is free from acid. By the stirring method this means the use of a large volume of the mother liquor even if the latter is slightly alkaline with ammonia.

It has not hitherto been suggested that the mother liquor should be so far alkaline with ammonia that one application of it, by the stirring method, should suffice to produce a neutral sulphate, the reason being, no doubt, that such a treatment spoils the colour of the sulphate crystals. The reason of this discoloration of the sulphate crystals when the mother liquor is used, is that the latter contains small amounts of impurities of a tarry nature as well as ferrous iron dissolved in it, which become insoluble when the mother liquor is exposed to the air, as is that which adheres to the crystals washed with the mother liquor.

The process of neutralizing acid crystals from an ammonium sulphate saturator which forms the subject matter of the present invention, consists in first making alkaline with ammonia, free from sulphuretted hydrogen, mother liquor which has drained from crystals removed from the saturator, the proportion of ammonia being sufficient to neutralize the liquor and also the acid likely to be present in the crystals to be treated. This ammoniacal mother liquor is then treated with a suitable oxidizing agent, for instance air, until no further precipitate is produced, whereupon it is filtered. By the oxidizing action of the air ferrous iron contained dissolved in the ammoniacal liquor, probably in the form of ferrous hydroxide, is oxidized into ferric hydroxide which is insoluble in the ammoniacal liquor thus $2Fe(OH)_2 + H_2O + O = 2Fe(OH)_3$. At the same time the tarry impurities are precipitated. The oxidation and the filtration are conducted while the temperature of the liquid remains or is kept at that which it had when it left the crystals. The filtered, tepid, ammoniated mother liquor is now ready for mixing with the drained crystals to be treated, the quantity of liquor being conveniently three times the weight of the crystals; the mixture is stirred and remaining impurities are separated by settling the crystals and decanting or otherwise removing the liquid containing the suspended impurities. This liquid may be returned to the saturator.

The settled salt may be centrifuged to drain it; it is then neutral and of good colour.

Having thus described the nature of the invention and the best means we know of carrying the same into practical effect, we claim:—

A process of neutralizing acid ammonium sulphate crystals removed from the saturator, which consists in making alkaline with ammonia free from sulphuretted hydrogen, mother liquor which has drained from crystals removed from the saturator, then treating the ammoniacal mother liquor with an oxidizing agent and filtering it, and finally stirring the filtered mother liquor with the ammonium sulphate crystals, substantially as described.

In testimony whereof we have signed our names to this specification.

EDWARD VICTOR EVANS.
PERCY PARRISH.
ORLANDO WILLIAM WEIGHT.